(12) United States Patent
Hill

(10) Patent No.: US 9,027,897 B2
(45) Date of Patent: May 12, 2015

(54) STANDOFF CONNECTOR FOR USE, FOR EXAMPLE, AS A POST BASE

(71) Applicant: Oz-Post International, LLC, Richardson, TX (US)

(72) Inventor: Ian A. Hill, Plano, TX (US)

(73) Assignee: Oz-Post International LLC, Richardson, TX (US)

( * ) Notice: Subject to any disclaimer, the term of this patent is extended or adjusted under 35 U.S.C. 154(b) by 43 days.

(21) Appl. No.: 13/918,265

(22) Filed: Jun. 14, 2013

(65) Prior Publication Data
US 2013/0334389 A1     Dec. 19, 2013

Related U.S. Application Data

(60) Provisional application No. 61/660,871, filed on Jun. 18, 2012.

(51) Int. Cl.
| | | |
|---|---|---|
| *F16M 13/00* | (2006.01) | |
| *E04H 12/22* | (2006.01) | |
| *E04C 3/36* | (2006.01) | |

(52) U.S. Cl.
CPC ......... *F16M 13/00* (2013.01); *E04C 3/36* (2013.01); *E04H 12/2261* (2013.01); *E04H 12/2292* (2013.01)

(58) Field of Classification Search
CPC ........ F16M 13/00; E04C 3/36; E04H 12/2261; E04H 12/2292
See application file for complete search history.

(56) References Cited

U.S. PATENT DOCUMENTS

| | | | | |
|---|---|---|---|---|
| 5,794,395 | A * | 8/1998 | Reed | 52/298 |
| 7,992,362 | B2 * | 8/2011 | Petta | 52/848 |
| 8,782,978 | B1 * | 7/2014 | Frenette et al. | 52/296 |
| 2002/0139069 | A1 * | 10/2002 | Buffkin et al. | 52/170 |
| 2008/0283702 | A1 | 11/2008 | Ikerd | |
| 2013/0146606 | A1 * | 6/2013 | Blay Orenga et al. | 220/628 |

* cited by examiner

*Primary Examiner* — Amy Sterling
(74) *Attorney, Agent, or Firm* — Gardere Wynne Sewell LLP; Andre M. Szuwalski

(57) ABSTRACT

A standoff connector forming, for example, a standoff post base, includes a base member having a first edge and a second edge opposite the first edge. The first edge is configured to include an extending first projection, and the second edge is configured to include an extending second projection. The standoff connector includes a first stirrup plate member that is selectably attachable to the base member at the first edge by inserting the first projection into and through an aperture formed in the first stirrup plate that is sized and shaped to receive the first projection. The standoff connector further includes a second stirrup plate member that is selectably attachable to the base member at the second edge by inserting the second projection into and through an aperture formed in the second stirrup plate that is sized and shaped to receive the second projection.

20 Claims, 9 Drawing Sheets

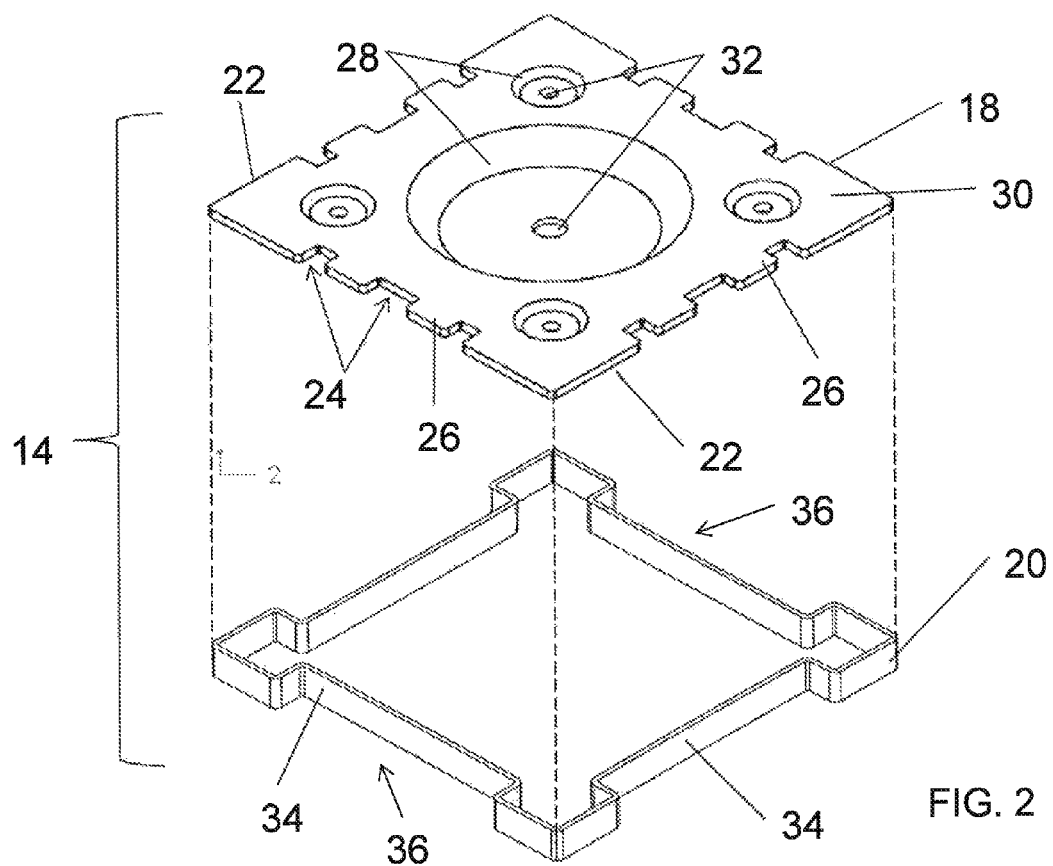

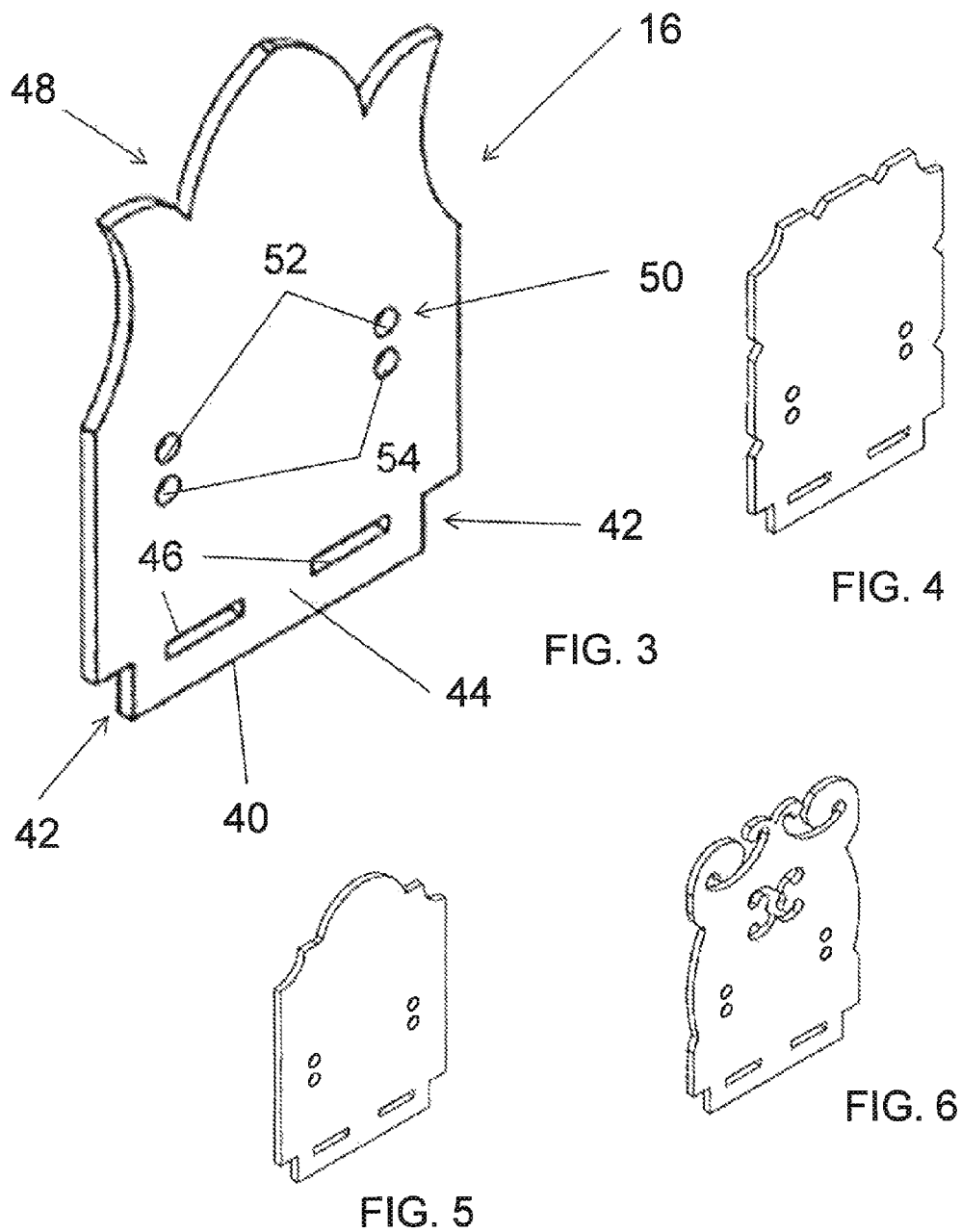

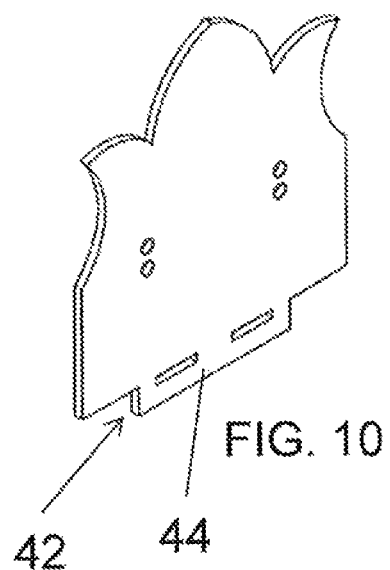
FIG. 10
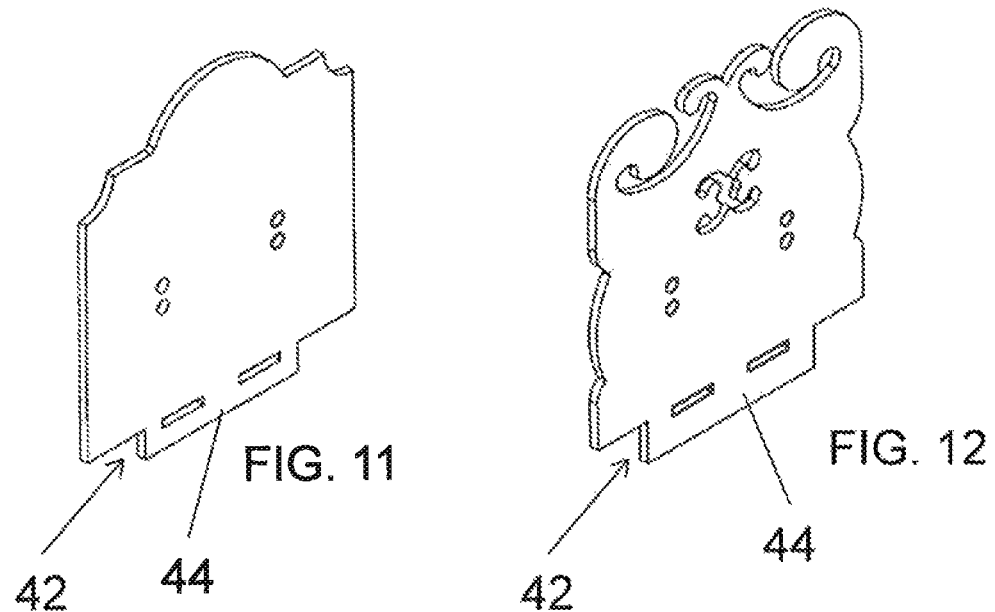
FIG. 11
FIG. 12

US 9,027,897 B2

STANDOFF CONNECTOR FOR USE, FOR EXAMPLE, AS A POST BASE

PRIORITY CLAIM

This application claims priority from U.S. Provisional Application for Patent No. 61/660,871 filed Jun. 18, 2012, the disclosure of which is incorporated by reference.

BACKGROUND OF THE INVENTION

1. Technical Field of the Invention

The present invention relates generally to a standoff connector for use in supporting a wood structural member.

2. Description of Related Art

It is well known to those skilled in the art that wood structural members, for example, wood post members, must be raised above concrete surfaces that are subject to wetting. It is conventional to use a standoff connector of some type as a base for such installations. A typical standoff connector includes a base plate (with means for supporting attachment of the base plate to an underlying substrate such as a concrete surface) and at least one pair of laterally spaced apart stirrup members mounted to and extending upwardly from the base plate. The base plate is provided with a thickness in accordance with commercial and residential building codes, typically of between one-half to one inch, to ensure that any wood structural member supported by the standoff connector is attached is sufficiently spaced above the underlying substrate.

For installation, the base plate is first secured to the underlying substrate. A bottom surface of the wood structural member is then placed between the pair of laterally spaced apart stirrup members in a position resting on a top surface of the base plate. The stirrup members are arranged against side surfaces of the received wood structural member. Mounting devices, such as screws or bolts, are then driven through the stirrup members, for example through openings provided therein, to pass into (and perhaps through) the wood structural member. The wood structural member is thus secured to the standoff connector, with the standoff connector secured to the underlying substrate. The thickness of the base plate separates the bottom surface of the wood structural member from the underlying substrate.

There are a number of drawbacks experienced with use of the conventional standoff connector described above. The standoff connector is typically formed of galvanized steel and has a utilitarian appearance driven by its functional configuration. In most applications, it is preferred that such a standoff connector not be visible. It is thus typical for some form of finish carpentry to be used to conceal the standoff connector from view. For example, the finish carpentry may box or case around the standoff connector with wood trim pieces of a type similar to, or complementary of the supported wood structural member. There is accordingly an added cost to use of the standoff connector that is associated with the need to hide the connector itself.

What is needed is a standoff connector which provides the standoff and structural member support functions but is configured to present an attractive appearance obviating the need for finish concealment.

In accordance with an embodiment, an apparatus comprises: a base member having a first edge and a second edge opposite the first edge, wherein each of the first and second edges includes an extending tab member; and a plurality of attachable stirrup plate members, each stirrup plate member including a bottom portion with at least one slot sized and shaped to receive the extending tab member when said attachable stirrup plate members are attached to the first and second edges of the base member.

In an embodiment, an apparatus comprises: a base member having a first edge, a second edge opposite the first edge, a first projection extending at said first edge; and a second projection extending at said second edge; a first stirrup plate member selectably attachable to the base member at said first edge, the first stirrup plate member including an aperture sized and shaped to receive the first projection; and a second stirrup plate member selectably attachable to the base member at said second edge, the second stirrup plate member including an aperture sized and shaped to receive the second projection.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 2 is an exploded perspective view of a base member for the standoff connector of FIG. 1;

FIG. 3 is a perspective view of a stirrup plate member for the standoff connector of FIG. 1;

FIGS. 4-6 illustrate perspective views of stirrup plate members having different ornamental features;

FIGS. 10-12 illustrate perspective views of stirrup plate members having different ornamental features;

DETAILED DESCRIPTION OF THE DRAWINGS

Figure 1:
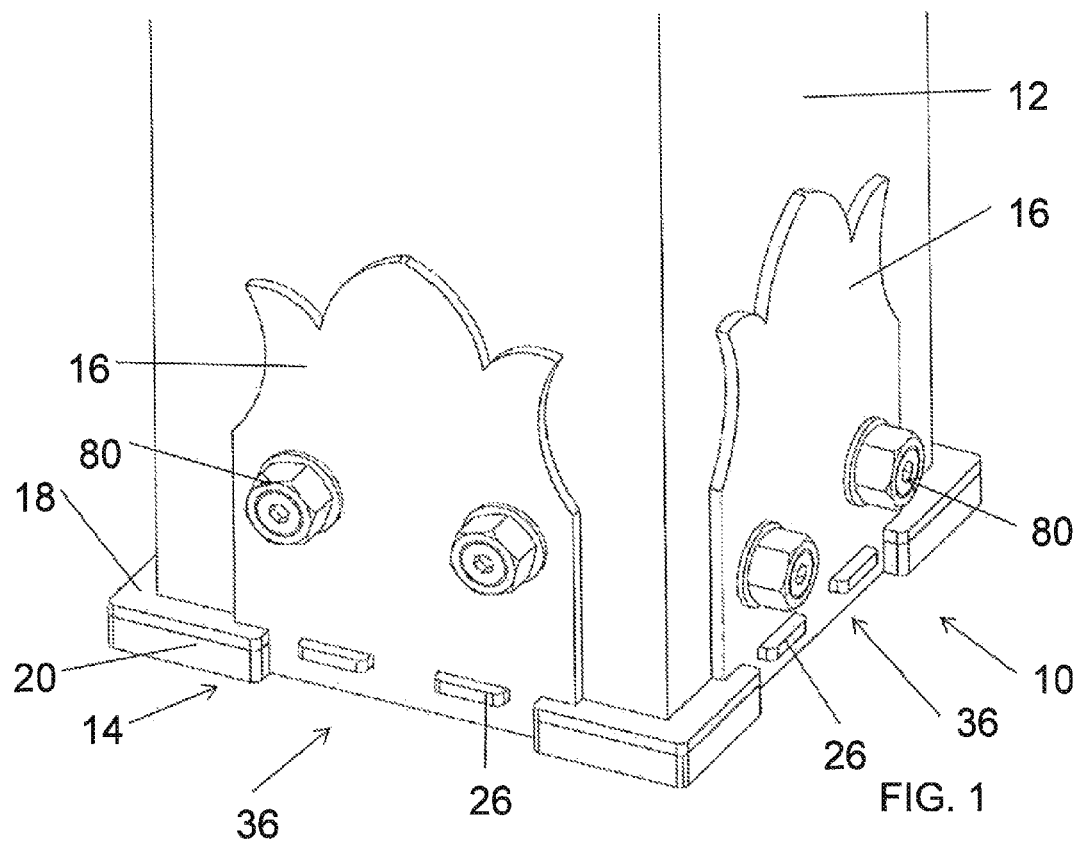
FIG. 1 is a perspective view of a standoff connector.

Reference is now made to FIG. 1 which shows a perspective view of a standoff connector 10 coupled to a wood structural member 12 (in this case comprising a wood post member). The standoff connector 10 includes a base member 14 and a plurality of selectably attachable stirrup plate members 16.

Reference is now made to FIG. 2 which shows an exploded perspective view of the base member 14 for the standoff connector 10 of FIG. 1. The base member 14 comprises a base plate 18 and a side sill 20. The side sill 20 generally follows the periphery of the base plate and is mounted to a bottom surface of the base plate 18, for example, through welding. A top surface 30 of the base plate 18 is configured to support the wood structural member 12. The base plate 18 is generally square in shape with four side edges 22. A plurality of cutouts 24 are formed in each side edge 22 to define at least one tab (or projection) 26 per side edge.

The base plate 18 further includes a plurality of dimples 28 formed in a top surface 30. Each dimple 28 includes a mounting opening 32 configured to receive a mounting device, such as a screw or bolt, which would be used to attach the base member 14 to a supporting substrate surface (such as a concrete surface). The dimples 28 are formed with a depth sufficient to fully receive a head portion of the mounting device. With the dimples 28, the head portions of received mounting devices are recessed below the top surface 30 of the base plate 18. This configuration will allow the bottom surface of the wood structural member 12 to rest flush on the top surface 30 of the base plate 18. The center dimple 28 is optional and may instead be omitted completely. In an alternative embodiment, the center dimple 28 may be replaced with an opening (see, FIG. 7).

The side sill 20 is formed of one or more material strips 34 attached together and to a bottom surface of the base plate 18. The strips 34 generally follow the shape of the side edge 22. The strips 34 of the side sill 20 depart from the side edge 22 to form one recess area 36 per side edge. The recess area 36 corresponds in location to where the cut-outs 24 and tabs 26 are formed in the base plate 18.

Reference is now made to FIG. 3 which shows a perspective view of the stirrup plate member 16 for the standoff connector of FIG. 1. The stirrup plate member 16 includes a bottom portion with a bottom edge 40. The bottom edge 40 includes end notches 42 defining a center tab 44. The end notches 42 are optional, as discussed below and shown in FIGS. 13-15. At least one slot (aperture) 46 is formed in each center tab 44. The slots 46 are sized and shaped to receive corresponding tabs 26 (FIG. 2) as formed by the cut-outs 24 in each side edge 22 of the base plate 18. The attachment of the stirrup plate members 16 to the base plate 18 through use of the slots 46 and tabs 26 is shown in FIG. 1.

An upper portion of each stirrup plate member 16 may include ornamental features 48. FIGS. 1-3 show one example of an ornamental feature 48 design. See FIGS. 4-6 for other examples of ornamental feature designs. This difference in ornamental design, while retaining a common design and placement of the slots 46, is important because it allows for the stirrup plates to be interchanged. Such an interchange may occur in connection with a renovation where the architectural and ornamental style of the construction changes. New stirrup plate members 16, matching the new architectural and ornamental style, can be easily installed without requiring that the wood support member or the base member 14 to be changed.

A central portion of each stirrup plate member 16 includes a plurality of mounting openings 50. The mounting openings 50 are configured to receive a mounting device 80 (such as a screw or bolt) for attaching the stirrup plate member 16 to a side surface of the wood structural member 12 (FIG. 1). The mounting openings 50 comprise an upper pair of openings 52 and a lower pair of openings 54.

The reason for providing two pairs of openings is to allow a single stirrup plate member 16 to be used at any side position of the standoff connector 10. This may be better understood by reference to FIG. 1. The left illustrated stirrup plate member 16 in FIG. 1 is attached to side surface of the wood structural member 12 using mounting devices 80 inserted through the upper pair of openings 52. The right illustrated, stirrup plate member 16 in FIG. 1 is attached to side surface of the wood structural member 12 using mounting devices 80 inserted through the lower pair of openings 54. This ensures that the mounting devices 80 on adjacent sides of the wood structural member 12 do not interfere with each other when installed. However, it will be noted that only one pair of openings will typically be used on any given stirrup plate member 16. To hide the unused pair of openings, the mounting devices 80 may be sized cover both pairs of openings when installed, or may use other techniques, such as a washer or other structure, sized sufficient to cover both pairs of openings.

Figure 7:
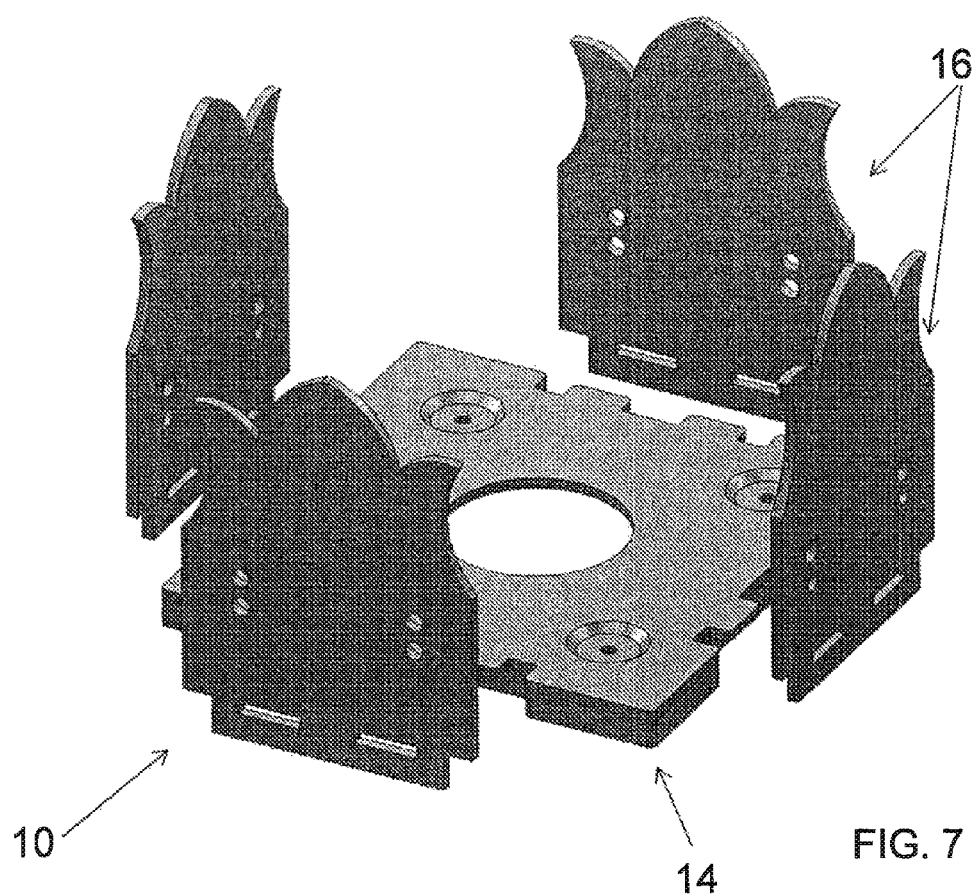
FIG. 7 is a disassembled perspective view of the standoff connector of FIG. 1.
Figure 8:
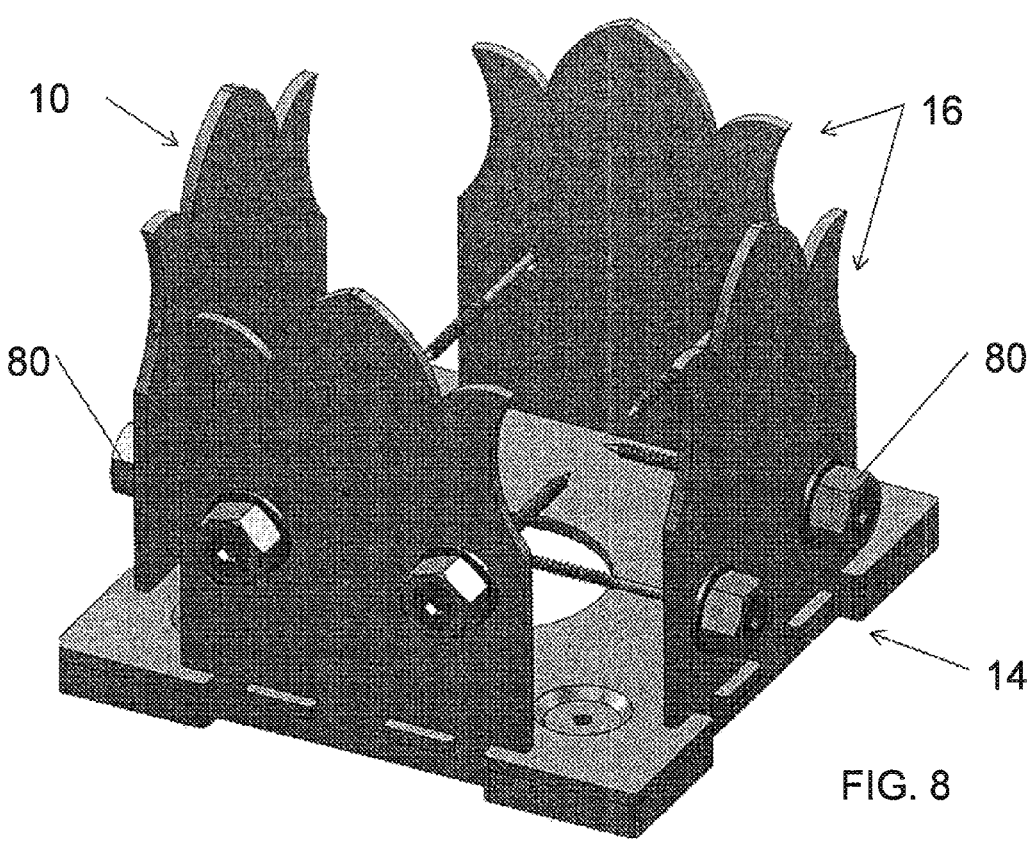
FIG. 8 is an assembled perspective view of the standoff connector of FIG. 1.

Reference is now made to FIG. 7 which shows a disassembled perspective view of the standoff connector 10 of FIG. 1, and to FIG. 8 which shows an assembled perspective view of the standoff connector 10 of FIG. 1. FIGS. 7 and 8 illustrate the selectable assembly relationship between the stirrup plate members 16 and the base member 14. In assembling the standoff connector 10, the user selects the desired stirrup plate member 16 (based for example on ornamental features and/or size of the wood structural member 12) and installs one stirrup plate member 16 to each side edge 22 by inserting the base plate tab 26 into the stirrup plate member slot 46. The cut-outs 24 and recess area 36 permit each tab 26 to be fully inserted in and through the slot 46 so that the stirrup plate member 16 may be positioned in a manner adjacent to the side of the wood structural member 12 (see, FIGS. 1 and 8). Although the use of four stirrup plate members 16 arranged in two opposed pairs is shown, it will be understood that alternatively just a single opposed pair of stirrup plate members 16 could be used. Mounting devices 80 are then inserted through one or more of the mounting openings 50 of each stirrup plate member 16 and driven into the side of the wood structural member 12. The interlocking of the stirrup plate members 16 and the base member 14 through the tab 26 and slot 46 arrangement prevents vertical displacement of the stirrup plate members 16 relative to the base member 14, and thus retains the wood structural member 12 to the top surface of the base plate 18.

Figure 9:
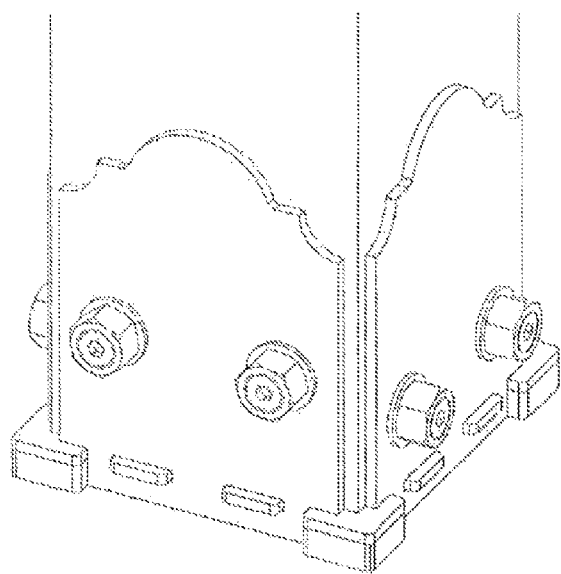
FIG. 9 is a perspective view of an alternative configuration for the standoff connector.

The base member 14 may be sized relative to the wood structural member 12 being secured. FIG. 1, for example, illustrates the use of a relatively larger sized base member 14 for use with a relatively larger sized wood structural member 12 (in this case, a 6×6 wood post member). FIG. 9, on the other hand, illustrates the use of a relatively smaller sized base member 14 for use with a relatively smaller sized wood structural member 12 (in this case, a 4×4 wood post member). It will be noted, however, that the implementations of FIGS. 1 and 9 utilize a same sized stirrup plate member 16. To accomplish this, the relatively smaller sized base ember 14 of FIG. 9 is provided with cut-outs 24 and tabs 26 on each side edge 22 that are sized and shaped matching the cut-outs and tabs provided on the relatively larger sized base member 14 of FIG. 1.

In some installations, the use of stirrup plate members 16 of the relatively smaller size shown in FIG. 1 may be undesirable. For example, a person may find, from an aesthetic point of view, that these stirrup plate members 16 are undersized relative to the wood structural member 12. To address this concern, the stirrup plate members 16 may be scaled in size so as to provide a relatively smaller sized stirrup plate member 16 for use in application like that shown in FIGS. 1 and 9 and a relatively larger sized stirrup plate member for use in application like that shown in FIGS. 10-12. It will be noted that the stirrup plate members 16 of FIGS. 10-12 are wider than the stirrup plate members 16 of FIGS. 1 and 4-6, so as to cover more of the wood structural member 12, and further include a larger set of end notches 42. However, the slot 46 has a same size and positioning, and the center tab 44 has a same size and positioning, thus making the differently sized stirrup plate members 16 inter-changeable with each other and useful with either size base member 14.

It is known in the art that the stated dimensional size of a wood structural member is not the actual dimensional size. For example, a 6×6 wood post will not typically measure six actual inches on each side. This is especially the case when the wood structural member is something other than "rough cut" (where rough cut members more conventionally are dimensionally accurate or close to dimensionally accurate).

The differences in size may, for example, be geographic such that a 6×6 wood post in one geographic region is one size and a 6×6 wood post in another geographic region is another size. Alternatively, the differences in size may vary from lumber mill to lumber mill, or vary depending on the treatment made to the wood. It is not uncommon for a "6×6" wood post to have sides varying from 5.5 inches to 6.0 inches. It is also not uncommon for a square wood structural member to have a non-square cross-section. It is important that the standoff connector 10 address the foregoing dimensional variability issues.

The base member 14 is accordingly sized to support the highest expected dimensional size for the wood structural member. Thus, for use in connection with a 6×6 wood structural member, the base member 14 is sized with a supporting footprint slightly larger than 6×6. The recess area 36 and the cut-outs 24 formed in each side edge 22 of the base plate 18, however, are sized to support the smallest expected dimensional size for the wood structural member. Thus, for use in connection with a 6×6 wood structural member, the recess area 36 and the cut-outs 24 are at least 0.5 inches deep to match the 5.5×5.5 inch actual size of the 6×6 wood structural member. With this configuration, the tabs 26 on each side edge have a length of about 0.5 inches. This tab length permits a range of adjustment in the positioning of the selectably installed stirrup plate members 16 so that the stirrup plate members 16 can be positioned flush against the side surface of the wood structural member, no matter its actual dimensional size.

Figure 13:
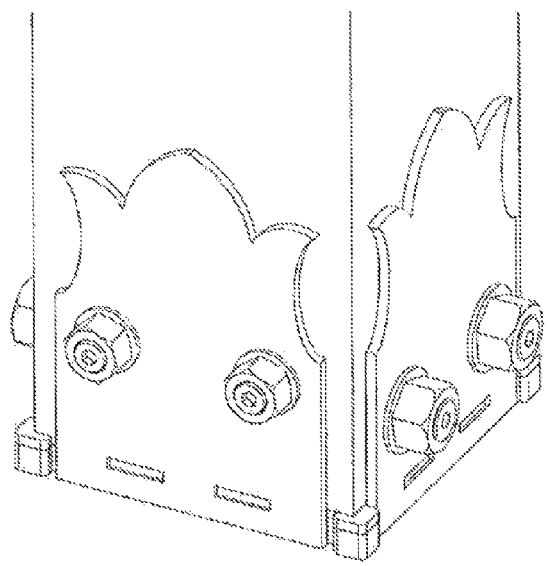
FIG. 13 is a perspective view of an alternative configuration for the standoff connector.

Reference is now made to FIG. 13 which shows a perspective view of an alternative configuration for the standoff connector. The configuration of FIG. 13 is similar to the configuration of FIG. 1 with two main exceptions. The first exception concerns use of end notches 42 and a center tab 44 in the bottom portion of each stirrup plate member 16. The stirrup plate members 16 for the implementation of FIG. 13 are configured with bottom portions that omit the end notches 42 and center tab 44. It will be noted, however, that the slots 46 of the stirrup plate members 16 in the implementation of FIG. 13 have a same size and positioning as with the FIG. 1 implementation. The second exception concerns the configuration of the side edges 22 of the base plate 18 for the base member 14. To accommodate the different shape of the bottom portion of the stirrup plate members 16, the cut-outs 24 on the outside of the tabs 26 for the base member 14 are larger so as to fit the entire bottom portion of the stirrup plate members 16.

Figure 14:
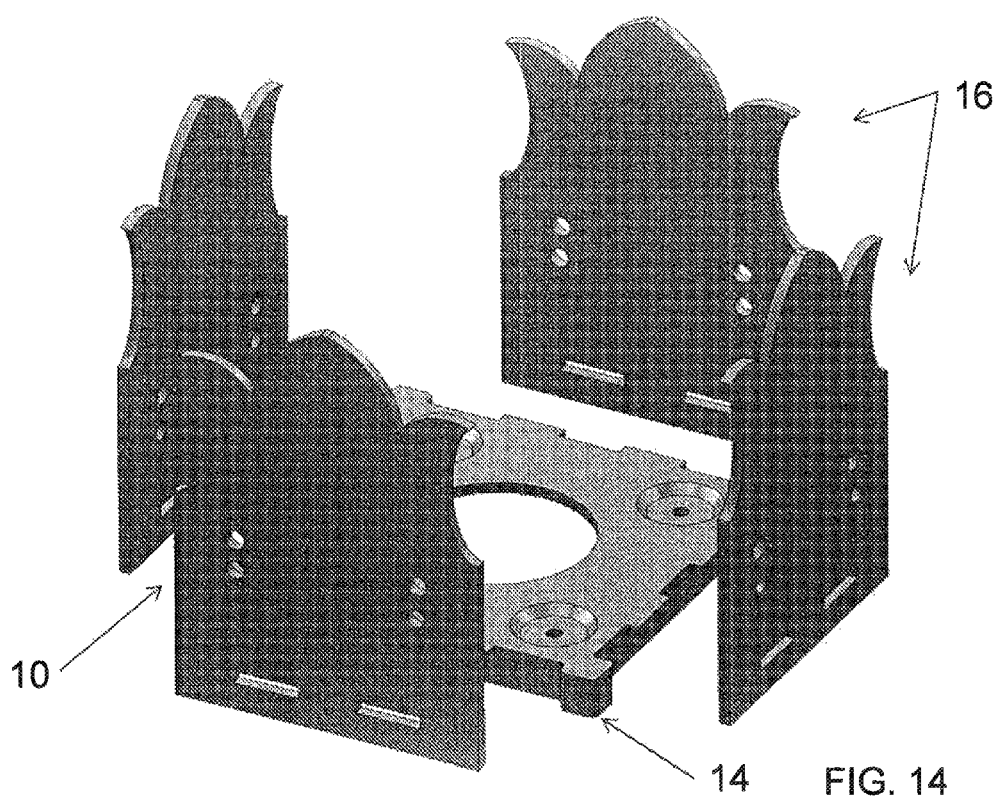
FIG. 14 is a disassembled perspective view of the standoff connector of FIG. 13.
Figure 15:
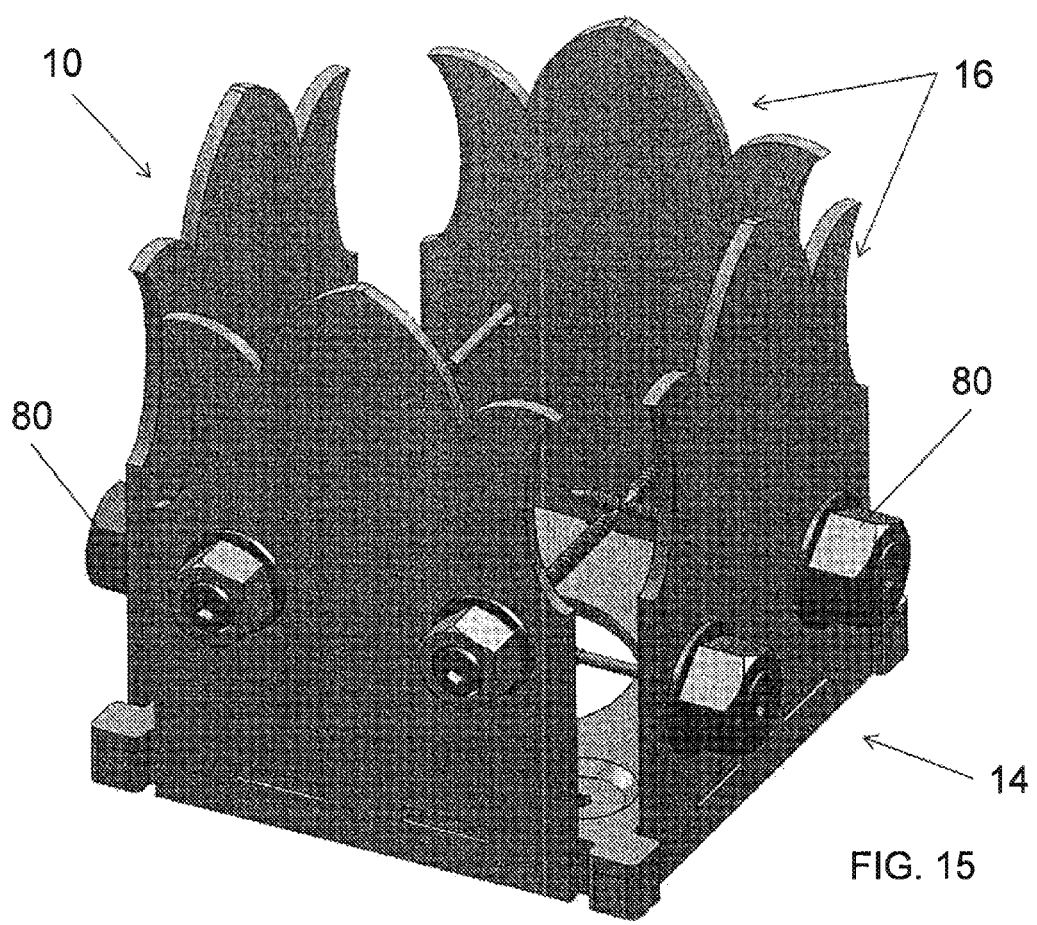
FIG. 15 is an assembled perspective view of the standoff connector of FIG. 13.

Reference is now made to FIG. 14 which shows a disassembled perspective view of the standoff connector 10 of FIG. 13, and to FIG. 15 which shows an assembled perspective view of the standoff connector 10 of FIG. 13. FIGS. 14 and 15 illustrate the relationship between the stirrup plate members 16 (which omit the end notches 42 and center tab 44) and the base member 14. In assembling the standoff connector 10, the user selects the desired stirrup plate member 16 (based for example on ornamental features and/or size of the wood structural member 12) and installs one stirrup plate member 16 to each side edge 22 by inserting the tab 26 into the slot 46. The cut-outs 24 and recess area 36 permit each tab 26 to be fully inserted in and through the slot 46 so that the stirrup plate member 16 may be positioned in a manner adjacent to the side of the wood structural member 12. Although the use of four stirrup plate members 16 is shown, arranged in two opposed pairs, it will be understood that alternatively the just a single opposed pair of stirrup plate members 16 could be used. Mounting devices 80 are then inserted through one or more of the mounting openings 50 of each stirrup plate member 16 and driven into the side of the wood structural member 12. The interlocking of the stirrup plate members 16 and the base member 14 through the tab 26 and slot 46 arrangement prevents vertical displacement of the stirrup plate members 16 relative to the base member 14, and thus retains the wood structural member 12 to the top surface of the base plate 18.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Apparatus, comprising:
   a base member configured to support a structural member and having a first edge and a second edge opposite the first edge, wherein each of the first and second edges includes an extending tab member; and
   a plurality of stirrup plate members, each stirrup plate member including a bottom portion with at least one slot sized and shaped to receive the extending tab member when said stirrup plate members are mounted to the first and second edges of the base member, and wherein each of the stirrup plate members includes a mounting opening configured to receive a mounting device that is configured to attach the stirrup plate member to a side surface of the structural member.

2. The apparatus of claim 1, wherein the base member further includes a third edge and a fourth edge opposite the third edge, wherein each of the third and fourth edges includes an extending tab member, and wherein the stirrup plate members are mounted to the third and fourth edges of the base member by receiving the extending tab member in said slot.

3. The apparatus of claim 1, wherein each stirrup plate member further includes a central portion including the mounting opening configured to receive the mounting device.

4. The apparatus of claim 3, wherein said mounting opening comprises at least one pair of openings.

5. The apparatus of claim 4, wherein said at least one pair of openings comprises at least two pairs of openings.

6. The apparatus of claim 5, wherein adjacent openings in the at least two pairs of openings are spaced apart from each other by a distance selected such that the mounting device, when installed in one of the adjacent openings, covers both adjacent openings.

7. The apparatus of claim 3, wherein said at least one opening comprises a first and a second adjacent openings.

8. The apparatus of claim 7, wherein the first and second adjacent openings are spaced apart from each other by a distance selected such that the mounting device, when installed in one of the first and second adjacent openings, covers both the first and second adjacent openings.

9. Apparatus, comprising:
   a base member having a first edge and a second edge opposite the first edge, wherein each of the first and second edges includes an extending tab member;
   a plurality of stirrup plate members, each stirrup plate member including a bottom portion with at least one slot sized and shaped to receive the extending tab member when said stirrup plate members are attached to the first and second edge of the base member;
   a base plate providing the first edge and second edge and the tab member extending from said first and second edges; and a side sill extending around a periphery of the base plate, said side sill attached to a bottom surface of the base plate.

10. The apparatus of claim 9, wherein the side sill is shaped to define, at each edge, a recess portion, said recess portion configured to receive the bottom portion of the attached stirrup plate member.

11. The apparatus of claim 10, wherein the bottom portion of the attached stirrup plate member includes end notches defining a center tab, and wherein said recess portion configured to receive the center tab of the attached stirrup plate member.

12. The apparatus of claim 9, wherein the base plate includes a top surface including at least one dimple.

13. The apparatus of claim 12, wherein the dimple includes an opening configured to receive a mounting device.

14. The apparatus of claim 13, wherein the dimple has a depth deep enough to fully receive a head portion of said mounting device without said head portion projecting above said top surface.

15. Apparatus, comprising:
- a base member having a first edge, a second edge opposite the first edge, a first projection extending at said first edge, and a second projection extending at said second edge, wherein the base member has a top surface configured to support a bottom surface of a structural member;
- a first stirrup plate member selectably attachable to the base member at said first edge, the first stirrup plate member including an aperture sized and shaped to receive the first projection; and
- a second stirrup plate member selectably attachable to the base member at said second edge, the second stirrup plate member including an aperture sized and shaped to receive the second projection, wherein the first and second stirrup plate members are configured for attachment to opposite side surfaces of the supported structural member and wherein each of the first and second stirrup plate members includes a mounting opening configured to receive a mounting device, said mounting device configured to secure the stirrup plate member to the side surface of the supported structural member.

16. The apparatus of claim 15, wherein said mounting opening comprises a first and a second adjacent openings, and wherein the first and second adjacent openings are spaced apart from each other by a distance selected such that the mounting device, when installed in one of the first and second adjacent openings, will cover both the first and second adjacent openings.

17. The apparatus of claim 15, wherein the top surface of the base member includes at least one dimple with an opening configured to receive a mounting device configured to secure the base member to an underlying substrate member.

18. The apparatus of claim 17, wherein the dimple has a depth deep enough to fully receive a head portion of said mounting device without said head portion projecting above said top surface.

19. The apparatus of claim 15, wherein each of the first and second edges includes a recess portion, said recess portion configured to receive a bottom portion of the stirrup plate member.

20. The apparatus of claim 19, wherein the bottom portion of the stirrup plate member includes end notches defining a center tab, and wherein said recess portion is configured to receive the center tab of the stirrup plate member.

* * * * *